Frederick Sleight's
Impt in Seed Drills

No. 120,112.  Patented Oct. 17, 1871.

Witnesses:

Inventor.

Frederick Sleight

UNITED STATES PATENT OFFICE.

FREDERICK SLEIGHT, OF WARREN COUNTY, NEW JERSEY.

IMPROVEMENT IN SEED-DROPPERS.

Specification forming part of Letters Patent No. 120,112, dated October 17, 1871.

*To all whom it may concern:*

Be it known that I, FREDERICK SLEIGHT, of the county of Warren and State of New Jersey, have invented certain new and useful Improvements in Seed-Drills; and do hereby declare the following to be a full, clear, and exact description thereof, reference being had to the accompanying drawing and to the letters of reference marked thereon.

The nature of my invention consists in the construction and arrangement of a seed-drill, whereby the operator is enabled to sow either broadcast or through drill-tubes, or both at the same time; and to regulate, in the latter case, at will the quantity that is to go through the tubes and that which is to be sown broadcast.

In order to enable others skilled in the art to which my invention appertains to make and use the same, I will now proceed to describe its construction and operation, referring to the annexed drawing which forms a part of this specification, and in which—

Figure 1:
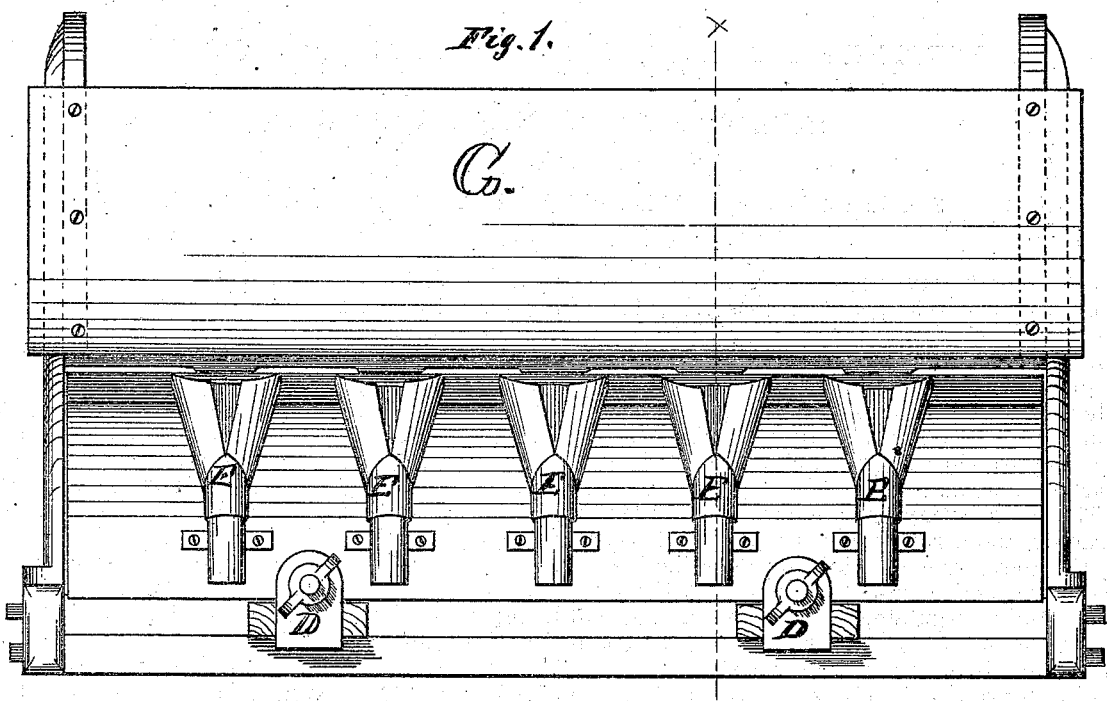
Figure 2:
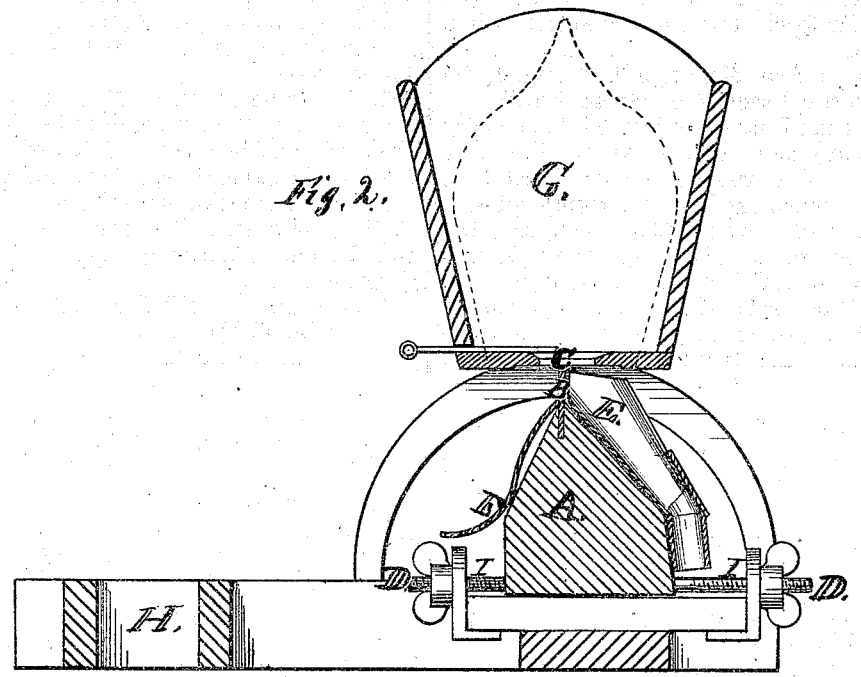

Figure 1 is a rear elevation, and Fig. 2 is a transverse vertical section of my seed-drill.

In the drawing I have not deemed it necessary to represent any more than what will illustrate my invention. G represents the usual drill-box, provided with openings C in its bottom, and with suitable means for shutting off and regulating the amount of seed sown. Running longitudinally under the drill-box G is a bar, A, the upper side of which is V-shaped and provided in the angle with a metal bar, B, which projects upward close to the bottom of the drill-box. On one side of the bar A are attached drill-tubes E E, corresponding with the openings C C, and on the other side is a curved metallic apron, F, running the entire length of said bar. The bar A is supported upon bolts or rods I I, which have screw-threads upon both ends, as shown in Fig. 2. These screw-rods pass through the bar A, and also through ears upon the frame of the drill; and upon the ends of said rods are thumb-nuts D D, by means of which the bar A is moved back and forth and held in any desired position.

It will readily be seen that by the adjustment of the bar A and its attachments, the operator can, at pleasure, cause all the seed to pass through the drill-tubes E E, or let it fall on the apron F to be sown broadcast; or part of the seed may be distributed through the tubes and part of it at the same time sown broadcast. In this latter case the amount of seed to be sown either way is regulated by the movement of the bar A.

Having thus fully described my invention, what I claim as new, and desire to secure by Letters Patent, is—

1. The tube E, apron F, and bar B, in combination with the hopper G and slide C, by which the seed may be sown in drills, or broadcast, or both at the same time, substantially as set forth.

2. In combination with the hopper G and slide C, the bar A with its attachments and screw-rods I I and thumb-nuts D D, for the purpose described.

FREDERICK SLEIGHT.

Witnesses
WM. M. DAVIS,
CHAS. F. FITCH.

(133)